(12) United States Patent
Abel

(10) Patent No.: US 8,011,684 B2
(45) Date of Patent: Sep. 6, 2011

(54) TRAILER TOWING-CONTROL APPARATUS

(76) Inventor: John Walton Abel, Midrand (ZA)

( * ) Notice: Subject to any disclaimer, the term of this patent is extended or adjusted under 35 U.S.C. 154(b) by 69 days.

(21) Appl. No.: 11/915,709

(22) PCT Filed: May 31, 2006

(86) PCT No.: PCT/IB2006/051740
§ 371 (c)(1),
(2), (4) Date: Nov. 27, 2007

(87) PCT Pub. No.: WO2006/129284
PCT Pub. Date: Dec. 7, 2006

(65) Prior Publication Data
US 2009/0146392 A1    Jun. 11, 2009

(30) Foreign Application Priority Data
May 31, 2005    (ZA) .................................. 2005/04434

(51) Int. Cl.
B60D 1/44    (2006.01)
B62D 13/02   (2006.01)
A01B 59/041  (2006.01)

(52) U.S. Cl. .................. 280/468; 280/442; 280/474

(58) Field of Classification Search .................. 280/468, 280/442, 474
See application file for complete search history.

(56) References Cited

U.S. PATENT DOCUMENTS

| 2,432,357 A | * | 12/1947 | Vars | 280/474 |
|---|---|---|---|---|
| 2,483,567 A | * | 10/1949 | Vars | 280/474 |
| 2,491,063 A | * | 12/1949 | Strong | 280/448 |
| 3,212,793 A | * | 10/1965 | Pietroroia | 280/443 |
| 3,454,285 A | * | 7/1969 | Van Peursem | 280/468 |
| 3,502,351 A |   | 3/1970 | Gray | 280/446 |
| 3,612,575 A |   | 10/1971 | Stewart | 280/474 |
| 3,663,039 A |   | 5/1972 | Morgan | 280/408 |
| 3,801,137 A |   | 4/1974 | Zucca | 280/476 |
| 4,133,552 A | * | 1/1979 | Sheine | 280/455.1 |
| 4,208,063 A | * | 6/1980 | Baker et al. | 280/445 |
| 4,345,775 A | * | 8/1982 | Merrifield | 280/443 |
| 4,405,147 A |   | 9/1983 | Horsman et al. | 280/443 |
| 4,451,058 A | * | 5/1984 | Curry | 280/476.1 |
| 4,645,226 A |   | 2/1987 | Gustavsson et al. | 280/423 A |
| 5,201,167 A |   | 4/1993 | Rowse | 56/6 |
| 5,244,226 A | * | 9/1993 | Bergh | 280/442 |
| 5,348,331 A | * | 9/1994 | Hawkins | 280/476.1 |
| 5,364,117 A | * | 11/1994 | Keith | 280/459 |
| 6,179,315 B1 | * | 1/2001 | Boriack | 280/419 |

(Continued)

FOREIGN PATENT DOCUMENTS

DE    27 01 834 A1    9/1977

(Continued)

Primary Examiner — Kevin Hurley
Assistant Examiner — Daniel Yeagley
(74) Attorney, Agent, or Firm — Henry B. Ward, III; Moore & Van Allen, PLLC

(57) ABSTRACT

The invention relates to a trailer towing-control apparatus comprising a towing means connectable between a trailer and a towing vehicle; the towing means having a first connection means at its operative forward end pivotably connectable to a towing vehicle and a second connection means pivotably connectable to the trailer on the other side of the axis of the trailer relative to the first connection means; and a restraint means to selectively allow for articulation of the first connection means relative to the towing vehicle or to prevent articulation of the towing means relative to the towing vehicle in a horizontal plane.

13 Claims, 7 Drawing Sheets

U.S. PATENT DOCUMENTS

| | | | |
|---|---|---|---|
| 6,273,446 B1 * | 8/2001 | Paul | 280/442 |
| 7,147,241 B2 * | 12/2006 | Beaujot et al. | 280/442 |
| 2007/0284851 A1 * | 12/2007 | Adcock et al. | 280/448 |
| 2008/0246253 A1 * | 10/2008 | Timmons | 280/442 |

FOREIGN PATENT DOCUMENTS

| | | |
|---|---|---|
| DE | 28 26 228 A 1 | 12/1978 |
| JP | 59-164211 | 9/1984 |
| WO | WO 0056588 A1 * | 9/2000 |

* cited by examiner

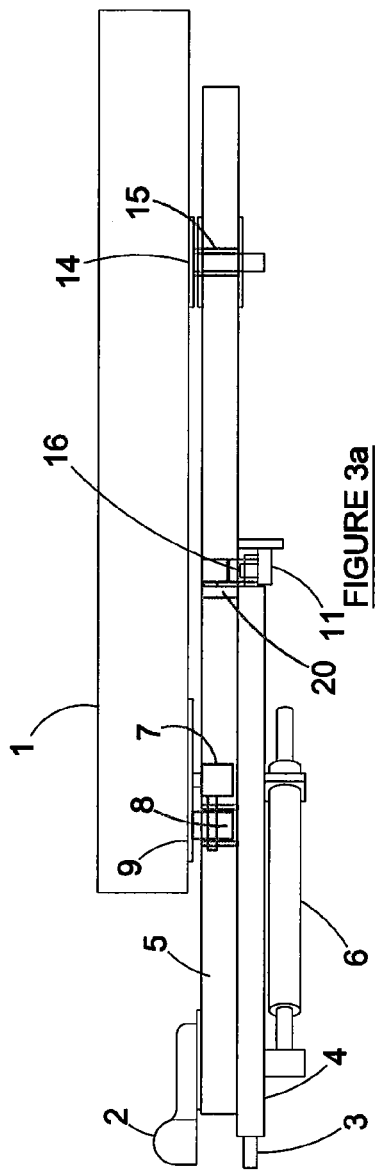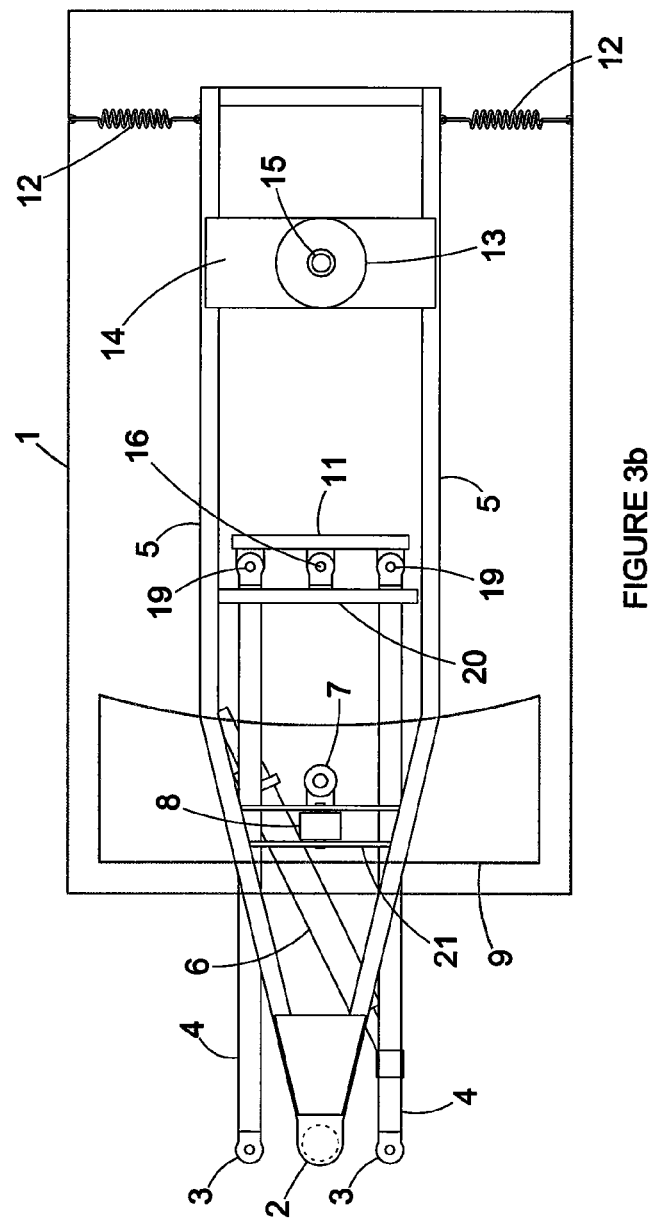

TRAILER TOWING-CONTROL APPARATUS

FIELD OF THE INVENTION

This invention relates to a trailer towing-control apparatus for the directional control of a trailer when connected to a towing vehicle, and more particularly, for steering the trailer in the reverse mode of travel.

BACKGROUND TO THE INVENTION

It is well known that it is difficult to reverse a towing vehicle and trailer. This is due to the articulation point being between the towing vehicle's rear wheels and the wheels of the trailer. The trailer is thus pushed from behind its wheels so that it turns in the opposite direction in which the towing vehicle turns when reversing.

OBJECT OF THE INVENTION

It is an object of this invention to provide a trailer towing-control upwards which, at least partially, alleviates the above-mentioned difficulty.

SUMMARY OF THE INVENTION

In accordance with this invention there is provided a trailer towing-control apparatus comprising a towing means connectable between a trailer and a towing vehicle; the towing means having a first connection means at its operative forward end pivotably connectable to a towing vehicle and a second connection means pivotably connectable to the trailer on the other side of the axis of the trailer relative to the first connection means; and a restraint means to selectively allow for articulation of the first connection means relative to the towing vehicle or to prevent articulation of the towing means relative to the towing vehicle in a horizontal plane.

The towing means includes two parallel elongate towing members.

The first connection means are pivotable connection means at the operatively front ends of the towing members pivotably attachable to complementary connection means on the towing vehicle. The rear ends of the towing members may be pivotably attached to a support frame of the towing means.

The restraint means is attached to a front half of one of the towing members and to a rear half of the other towing member.

The restraint means is a hydraulic cylinder is located and fixed diagonally between the two steel members to bias them to remain parallel.

A further feature of the invention provides for a hydraulic cylinder to be located and fixed diagonally between the two steel members to bias them to remain parallel.

There is provided for the hydraulic cylinder to contract and expand between the steel members when the towing vehicle is being driven forward. When the towing vehicle is reversed, the hydraulic cylinder as disabled to provide a rigid brace.

The flow of hydraulic oil in the hydraulic cylinder is controlled by an electrical solenoid such that when the solenoid is de-energised the hydraulic cylinder operates, and when energized the flow of hydraulic oil is blocked. It is provided that the energising of the solenoid is accomplished when the towing vehicle engages its reverse gear.

In the forward travel mode a further electrical solenoid, on the same electrical circuit as the reverse light circuit, is utilized to mechanically prevent the engagement means to articulate with the second articulation point.

On heavier trailers with steerable trailer wheels, another feature of the invention provides for a further closed loop hydraulic system to activate the turning of the trailer wheels when the trailer is being driven in reverse. Connected to the rear or second articulation point, either by geared rack and pinion or lever arm, is a double acting hydraulic cylinder that operates when the trailer manoeuvres either left or right on the swivel joint. The double acting cylinder is connected to the trailer wheel steering mechanism to steer the wheels of the trailer.

These and other features of the invention are described in more detail below.

DESCRIPTION WITH REFERENCE TO THE DRAWINGS

A preferred embodiment of the invention is described below by way of example only and with reference to the accompanying drawings, in which FIG. 1 is a side elevation view of a light-weight trailer coupled to a towing vehicle and indicating the hydraulic and mechanical attachments used to manoeuvre the trailer in forward and reverse mode of travel;

FIG. 3 shows both an elevation and a plan view of the frame and reverse control mechanism, identifying the various items of the invention required to effect user-friendly reversing;

Figure 1:
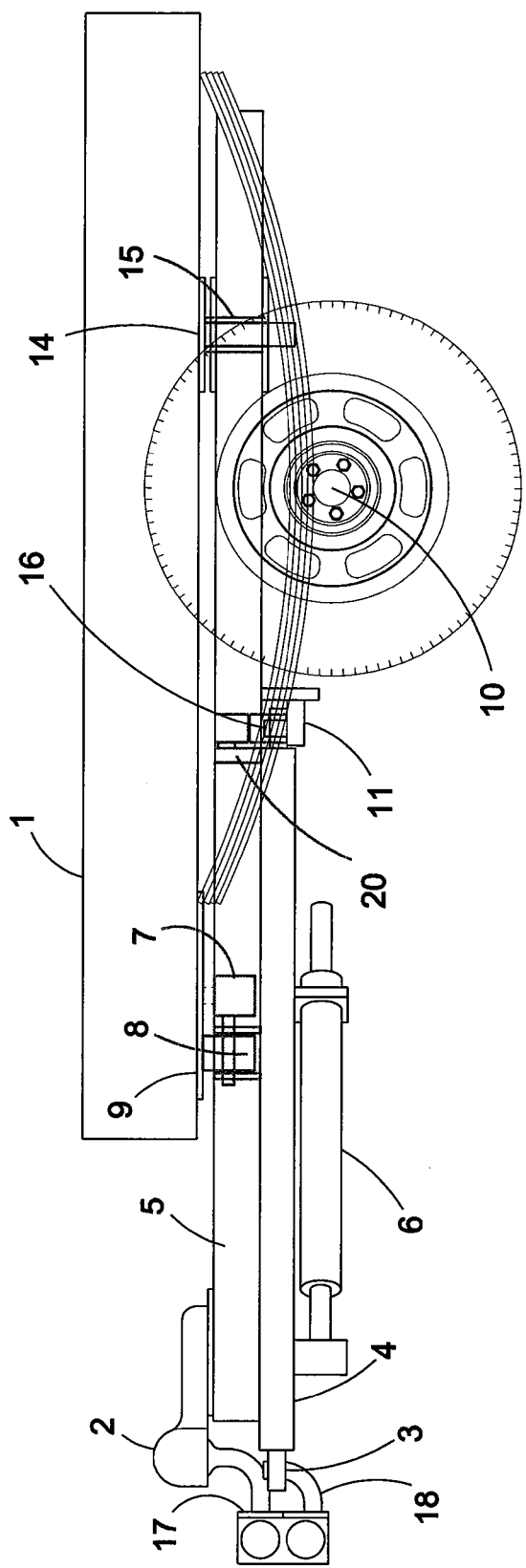
Figure 2A:
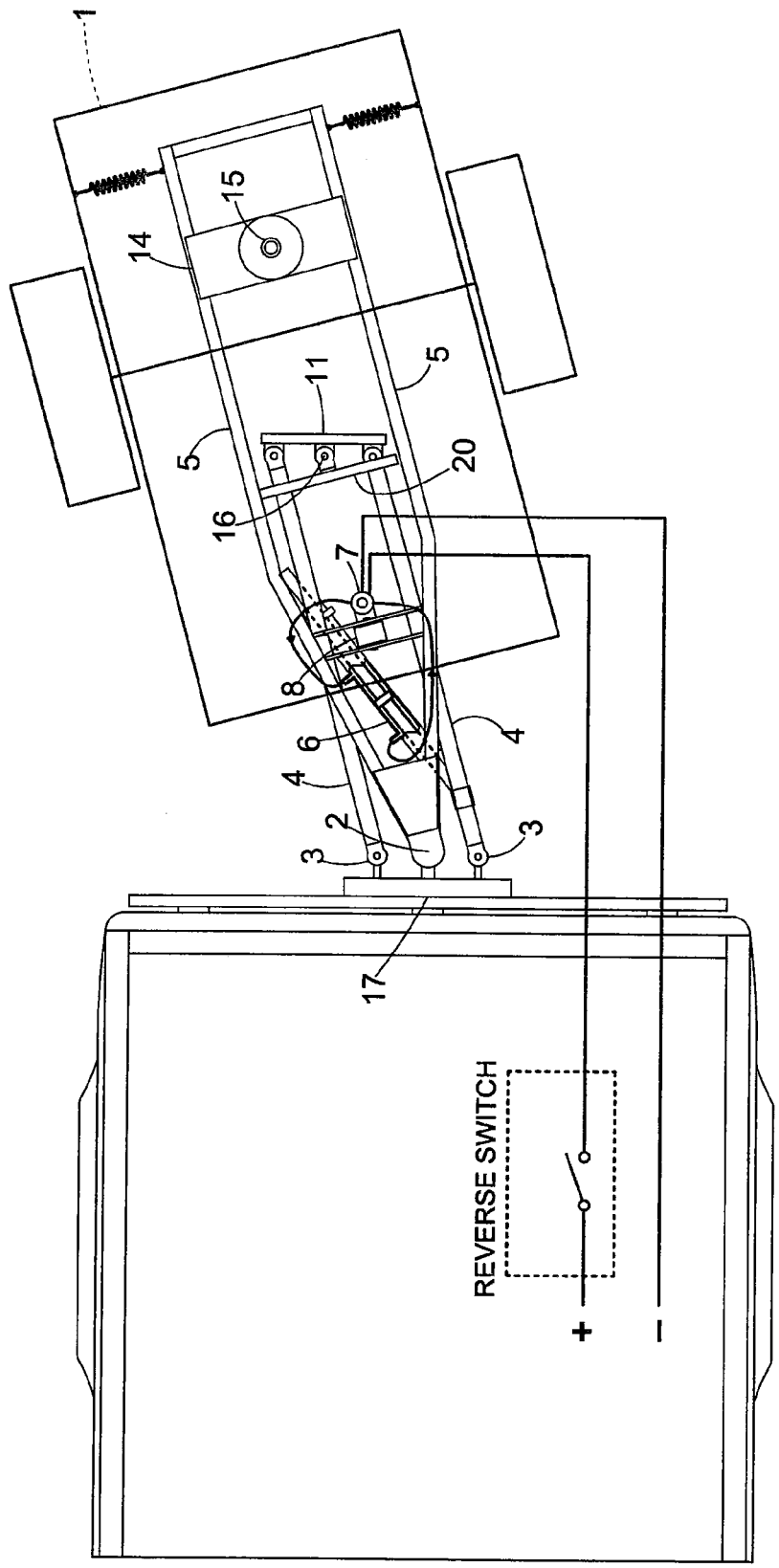
FIG. 2 is a plan view of a light-weight trailer being towed forward, showing articulation between vehicle and trailer in the traditional manner, and the same trailer being reversed with articulation at the rear end of the trailer.
Figure 2B:
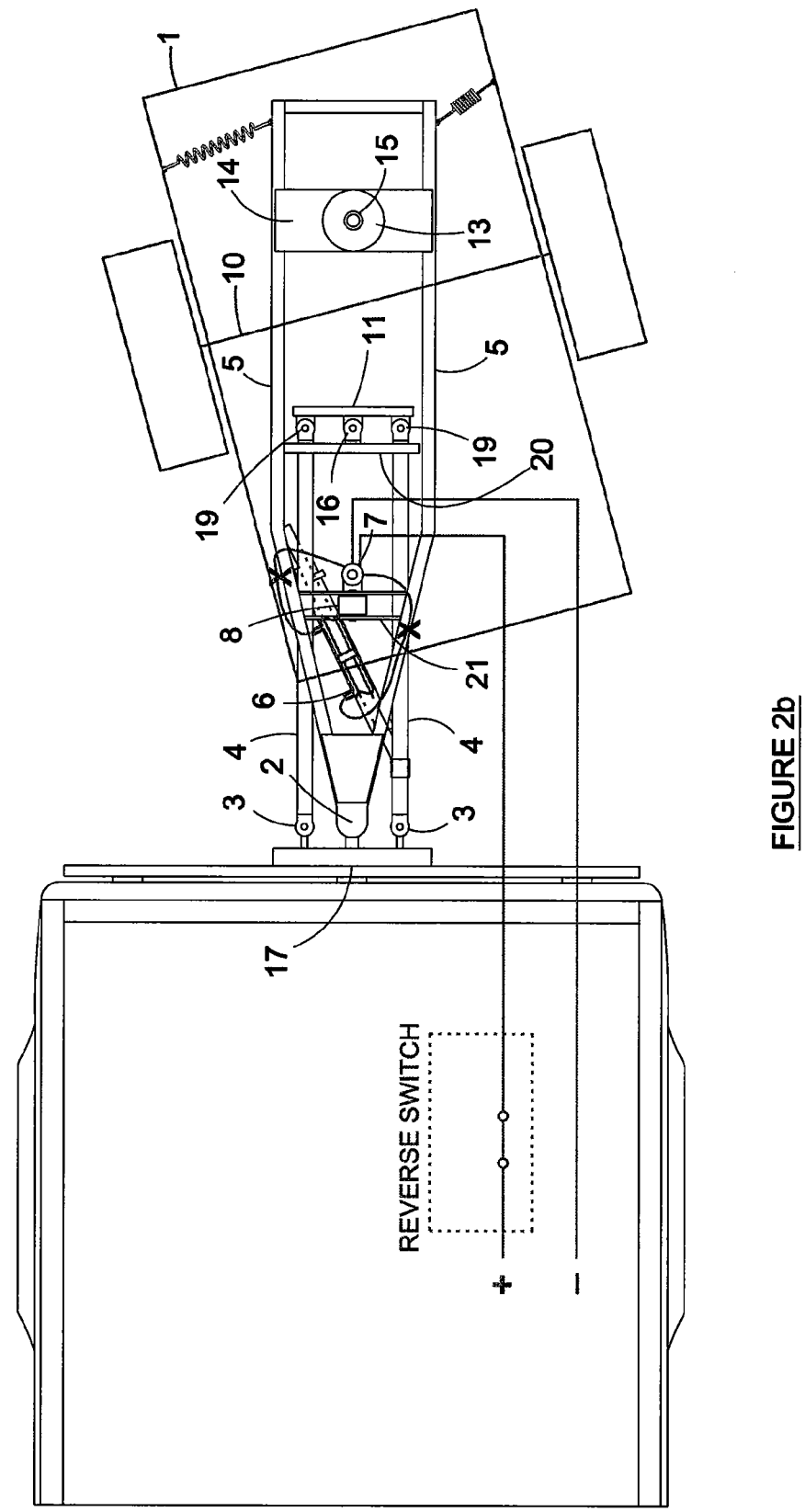
Figure 4A:
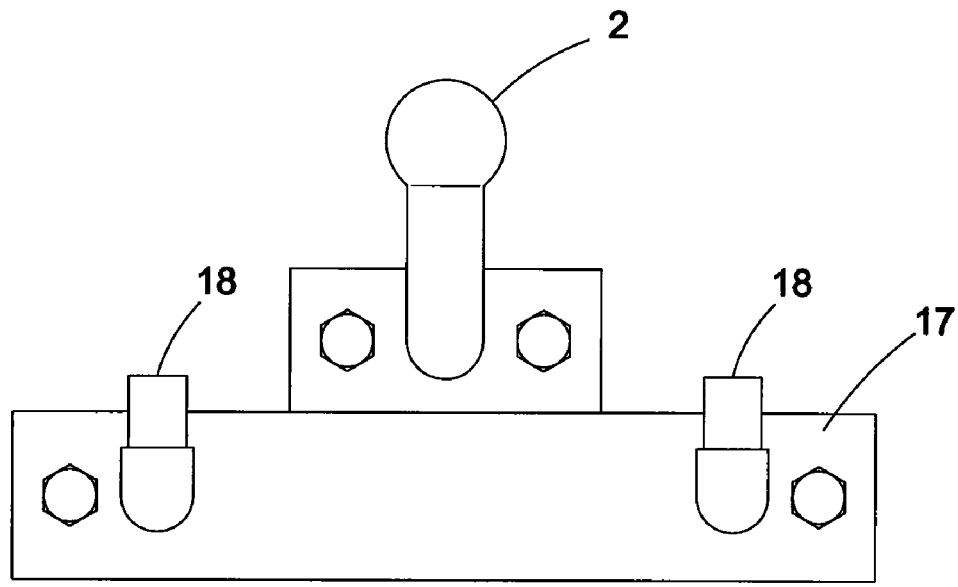
FIG. 4 shows an elevation and a plan view of a spigot plate attachment, to be connected to the towing vehicle in addition to the standard or conventional 50 mm ball-hitch.
Figure 4B:
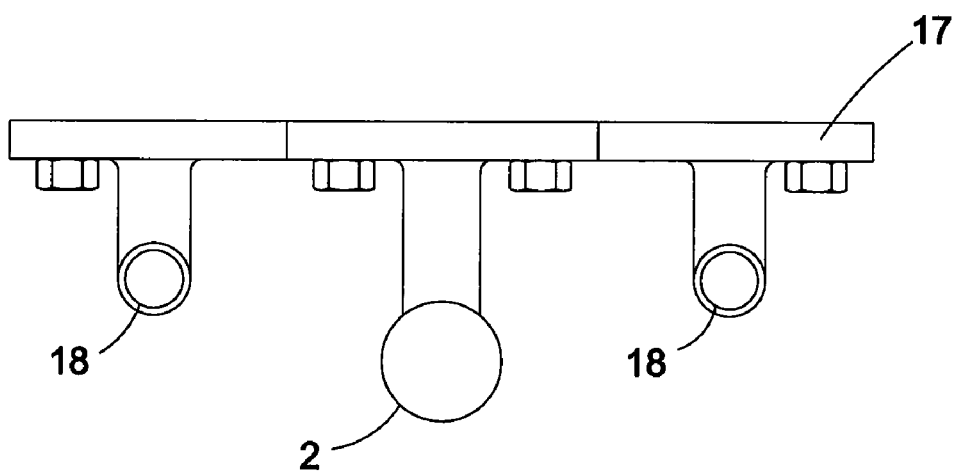
Figure 5A:
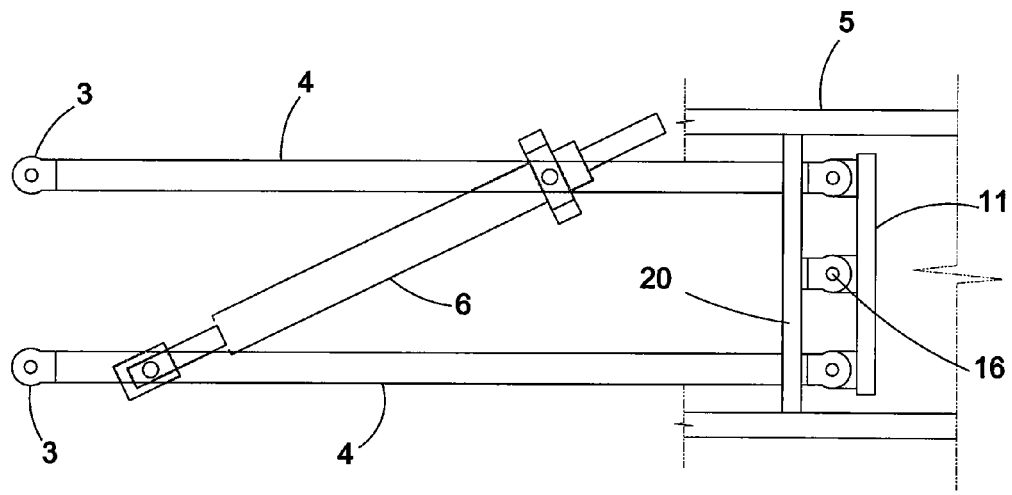
Figure 5B:
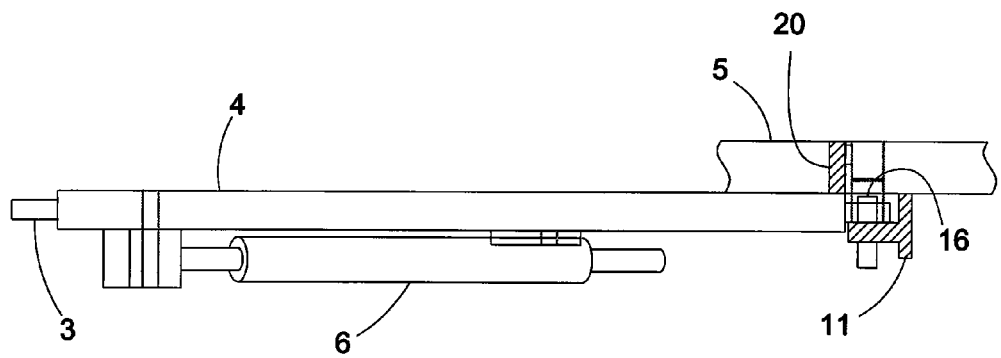
Figure 6:
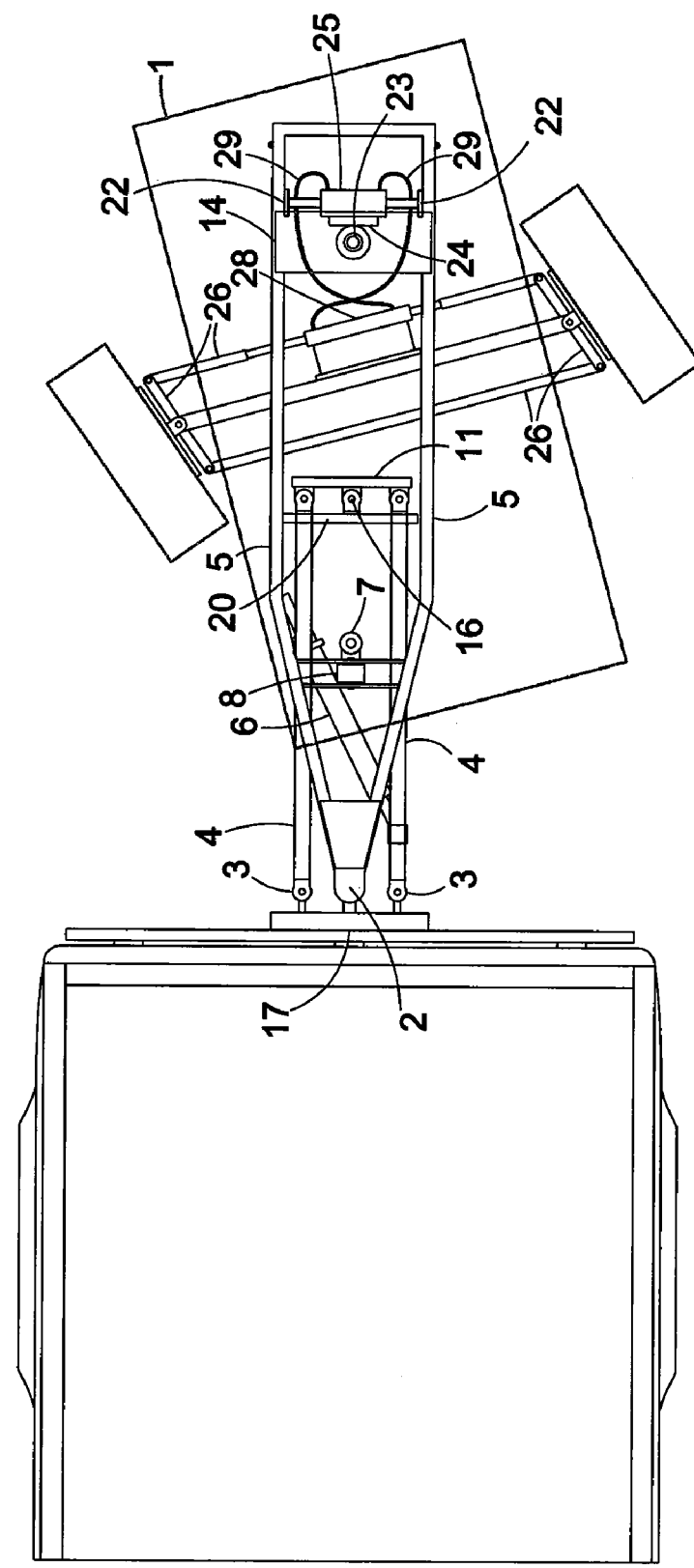

FIG. 5 details the assembly of the hydraulic brake and restraining rods that determine articulation at the rear end of the trailer; and FIG. 6 shows a plan view of a second embodiment of the invention on a heavy trailer being in a reverse mode of travel, whereby the wheels are hydraulically assisted to steer.

DETAILED DESCRIPTION WITH REFERENCE TO THE DRAWINGS

A trailer is connected to a towing vehicle by adding an attachment plate (17) to a standard ball-hitch (2).

The ball-hitch (2) is secured in a forward part of the trailer chassis frame (5) and the attachment plate (17) is secured by means of a pair of spigots (18) to a pair of trunnions (3) which form part of and are attached to the ends of a pair of restraining rods (4) or towing members. Together these form first connection means.

The other ends of restraining rods (4) are secured to a swivel plate (11) by a further pair of trunnions and spigots (19). The swivel plate (11) is connected as its center point to a hinge (16) which is also connected to a chassis frame tie (20) so that the plate hinges about its center in a horizontal plane.

A double acting hydraulic cylinder (6) is secured to the restraining rods (4) which are assembled in a parallel configuration with the hydraulic cylinder (6) assembled diagonally between the restraining rods (4).

A second connection means in the form of a pivotal hinge (15) is firmly fixed to the trailer body (1) by means of a strengthening plate (14) on the central longitudinal axis of the body (1) and to the rear of the trailer axle (10). The pivotal hinge (15) is also connected on a central longitudinal axis of the chassis frame (5) by means of a tie plate (13) and situated to the rear of the trailer axe (10).

Two stabilizing springs (12) are fixed at one end to the chassis frame (5) and the other end to the trailer body (1).

An electrical solenoid (7) is fixed on the central longitudinal axis of the chassis frame (5) by means of a tie plate (21) enabling the electrical solenoid (7) to engage into a slot machined at the center point of the body (1) into a rolling plate (9) which is firmly fixed to the body (1).

A support rolling wheel (8) is fixed on a central longitudinal axis of the chassis frame (5) be means of tie plate (21) enabling the rolling wheel (8) to support the body (1) interacting with rolling plate (9) which is fixed to the body.

In a second embodiment, shown in FIG. 6, a pivot hinge (23) which is firmly fixed to the trailer body (1) has a rack & pinion gear assembly (24) attached by key and keyway to the pivotal hinge (23). The rack is firmly fixed to a double acting hydraulic cylinder (25) which has its push-rod ends (22) fixed either side of the chassis frame (5). The hydraulic cylinder forms a second restraining means.

On rotation of the pivotal hinge (23) when the trailer is being reversed, the hydraulic cylinder (25) is moved in one or other direction inducing the movement of hydraulic oil in the flexible hydraulic tubes (29).

The hydraulic tubes (29) are connected at their other ends to a further double acting hydraulic cylinder (28) whereby the movement of the hydraulic oil forces the push rods of the hydraulic cylinder (28) to move one way or the other.

The hydraulic cylinder (28) is connected at its push rod ends to a linkage system (26) which reacts to the movement of the push rods and turns the steerable wheels attached to the axle (10).

The apparatus described above thus provides a mechanism for a trailer which allows the driver of a towing vehicle to directionally manoeuvre the trailer, such that the trailer follows the same path as the towing vehicle, in both forward and reverse modes of travel. In particular, when in the reverse mode of travel, the trailer reacts by hydraulic restraint, to follow the same directional path as the towing vehicle itself, allowing the driver greater control of the trailer. In the forward mode of travel the hydraulic restraint mechanism acts as a form of dampener to significantly reduce the risk of "jack-knifing". The apparatus operates in a simplified form for light-weight trailers with a short frame length, and in a more robust form for longer and heavier trailers. In particular with this invention, the wheels on a light-weight trailer are not steerable, but it is necessary that the wheels of heavier trailers steer in co-ordination with the towing vehicle, which is accomplished by a separate hydraulic and mechanical linkage system.

The articulation of the towing means relative to the towing vehicle is thus selectively prevented in a horizontal plane or allowed in all directions relative to the towing vehicle. In the reverse mode of travel, the articulation is prevented in the horizontal plane.

It will be appreciated that the invention herein described is convenient to use since it alleviates the difficulty of reversing a trailer and reduces the possibility of "jack-knifing" when a trailer is being towed forward or in reverse.

What is claimed is:

1. A trailer, suitable for use with a towing vehicle structured to be operated in a forward mode and a reverse mode, comprising a towing means connectable between a trailer body and the towing vehicle, wherein the trailer body includes an axle; the towing means having a first connection means at an operative forward end thereof pivotably connected to the towing vehicle and a second connection means pivotably connected to the trailer body, and the second connection means is positioned between the axle and rear end of the trailer body; and a restraint means to selectively allow for articulation of the first connection means relative to the towing vehicle or to prevent articulation of the first connection means relative to the towing vehicle wherein the restraint means is in an operative state when the towing vehicle is in the reverse mode to prevent articulation of the first connection means relative to the towing vehicle and the restraint means is in an inoperative state when the towing vehicle is in the forward mode to allow articulation of the first connection means relative to the towing vehicle.

2. A trailer as claimed in claim 1 in which the towing means includes parallel elongate towing members.

3. A trailer as claimed in claim 2 in which the first connection means are attachable to complementary connection means on the towing vehicle.

4. A trailer as claimed in claim 2 in which rear ends of the towing members are pivotally attached to a support frame of the towing means.

5. A trailer as claimed in claim 2 in which the restraint means is attached to a front half of one of the towing members and to a rear half of the other towing member.

6. A trailer as claimed in claim 2 in which the restraint means is a hydraulic cylinder located and fixed diagonally between the towing members to restrain the towing members from moving relative to each other when the towing vehicle is in the reverse mode.

7. A trailer as claimed in claim 6 in which the hydraulic cylinder contracts and expands between the towing members when the towing vehicle is in the forward mode.

8. A trailer as claimed in claim 6 in which the hydraulic cylinder is disabled to provide a rigid brace when the towing vehicle is in the reverse mode to prevent articulation of the towing means relative to the towing vehicle in a horizontal plane.

9. A trailer as claimed in claim 6 in which the flow of hydraulic oil in the hydraulic cylinder is controlled by an electrical solenoid.

10. A trailer as claimed in claim 9 in which the solenoid is energized to disable the hydraulic cylinder to provide a brace.

11. A trailer as claimed in claim 9 in which the flow of hydraulic oil is blocked when the solenoid is energized.

12. A trailer as claimed in claim 9 in which the solenoid is energized when the towing vehicle engages a reverse gear.

13. A trailer as claimed in claim 12, wherein the trailer comprises wheels and wherein the second connection means comprises a double-acting hydraulic cylinder in operable communication with the wheels of the trailer.

\* \* \* \* \*